No. 711,799. Patented Oct. 21, 1902.
H. A. TE POEL.
DRAFT EVENER.
(Application filed Aug. 4, 1902.)
(No Model.)
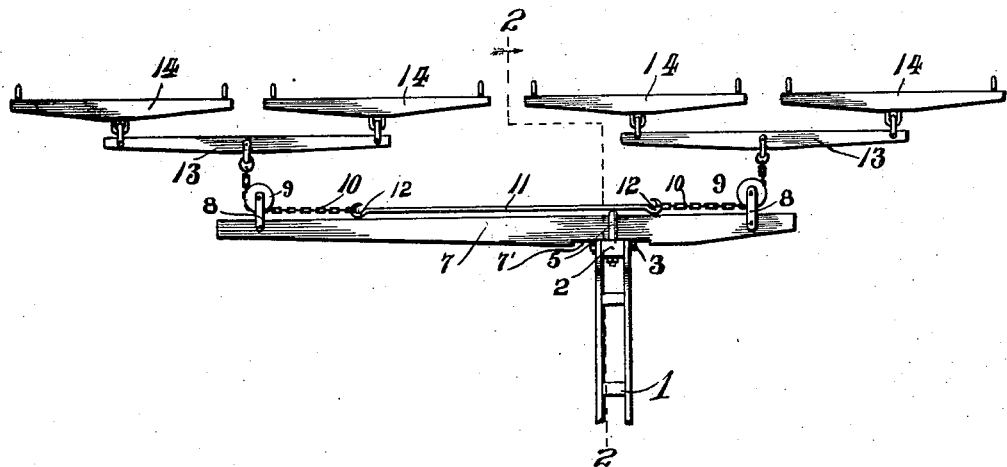
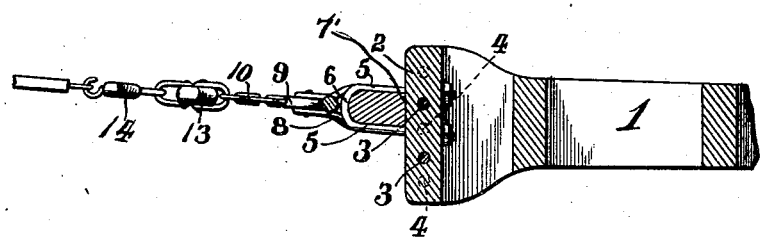
Witnesses
L. G. Handy
Edgar M. Kitchin
Inventor
Henry A. Te Poel
By Mason Fenwick & Lawrence
his Attorneys

UNITED STATES PATENT OFFICE.

HENRY A. TE POEL, OF PRAGUE, NEBRASKA.

DRAFT-EVENER.

SPECIFICATION forming part of Letters Patent No. 711,799, dated October 21, 1902.

Application filed August 4, 1902. Serial No. 118,397. (No model.)

*To all whom it may concern:*

Be it known that I, HENRY A. TE POEL, a citizen of the United States, residing at Prague, in the county of Saunders and State of Nebraska, have invented certain new and useful Improvements in Eveners; and I do hereby declare the following to be a full, clear, and exact description of the invention, such as will enable others skilled in the art to which it appertains to make and use the same.

The present invention relates to improvements in eveners, and more particularly to the four-horse type.

The object in view is the provision of a structure which shall prevent strains and which shall be adapted to be adjusted to various positions.

With this and other objects in view the invention consists of certain novel constructions, combinations, and arrangements of parts, as will be hereinafter fully described and claimed.

In the accompanying drawings, Figure 1 represents a top plan view of an evener embodying the features of the present invention. Fig. 2 represents an enlarged transverse vertical section taken on the plane of line 2 2 of Fig. 1.

Referring to the drawings by numerals, 1 indicates any suitable plow-beam, preferably constructed of two plates secured together; but it may be formed of a single plate bifurcated at its ends. Between the plates of beam 1 is positioned a vertically-adjustable block 2, which is formed with apertures for receiving securing-bolts 3 3, passed transversely therethrough and through the plates forming the beam 1. Each of the plates forming the beam 1 is provided with a series of apertures 4 4, which receive the bolts 3 3, whereby the said block 2 may be adjusted vertically relative to said beam 1. Suitable bolts 5 5 penetrate block 2 and are firmly secured thereto and have their outer ends connected by a suitable strip 6, firmly binding a transverse draft-bar 7 to the block 2, said bar having a slightly-beveled rear edge 7', whereby the bar will be held longitudinally in a horizontal plane, but transversely in a diagonal plane. Near the ends of bar 7 are secured forwardly-extending links 8 8, carrying antifriction-rollers 9 9, about which are passed chains 10 10, connected by an adjusting-rod 11, said bar being formed at its ends with hooks 12 12, engaging any one of the links of said chain, it being apparent that more or less of either chain may thus be employed, as may be desired. The outer free ends of chain 10 carry any suitable draft device, as doubletrees 13 13, having attached suitable whiffletrees 14 14.

In operation the block 2 may be adjusted to any desired height for effecting the depth of furrow of a plow carried by beam 1, and the upward pitch or diagonal plane of bar 7 will produce an evenness of movement, owing to the upward tendency of all draft devices for plows, which is due to the fact that the plow-beam is itself attached well beneath the horizontal plane of the point of draft. It will be observed that the bar 7 extends approximately twice the distance on one side of the block 2 that it does upon the other and that no auxiliary brace-rods are necessary owing to the particular form of attachment just described. The position of the bar 7 to one side of the center relative to the beam 1 makes it possible for three of the draft-horses to walk upon the land side and only necessitates one walking in the furrow, and the chain and rod connections will produce an evenness of draft regardless of the fact that more than one-half of the source of power is to one side of the center.

Having now described my invention, what I claim as new, and desire to secure by Letters Patent, is—

1. In a device of the class described, the combination with a suitable beam having an aperture formed in one end of the same, a block seated in said aperture, means for permitting the vertical adjustment of said block, a bar rigidly secured to the beam, chains carried near the ends of such bar, and a draft apparatus carried by said chains, and means for longitudinally adjusting the chains, substantially as set forth.

2. In a device of the class described, the combination of a suitable beam having an aperture in one end, a block mounted in said aperture and capable of vertical adjustment, a bar rigidly secured to said block, antifriction means carried by the end of said bar, chains passing through said antifriction means, means for adjusting said chains, and draft apparatus carried by said chains, substantially as set forth.

3. In a device of the class described, the combination of a suitable beam having an aperture in one end, a block vertically adjustable therein, a bar rigidly secured to said block, chains carried near the ends of said bar, a rod connecting said chains and formed with hooks for permitting the longitudinal adjustment of the chains, and draft apparatus carried by the free ends of said chains, substantially as set forth.

4. In a mechanism of the class described, the combination with a suitable beam having an aperture at one end, of a bar arranged transversely of said beam, means for permitting the adjustment of said bar relative to the beam, links extending forwardly of said bar, antifriction means carried by said links, chains passed about such antifriction means, a rod connecting the said chains and formed with open hooks for permitting the longitudinal adjustment of the chains, and draft apparatus carried by the said chains, substantially as set forth.

In testimony whereof I hereunto affix my signature in presence of two witnesses.

HENRY A. TE POEL.

Witnesses:
JOHN N. HANSON,
AMIEL L. KILLIAN.